US008920082B2

(12) United States Patent
Bryant et al.

(10) Patent No.: US 8,920,082 B2
(45) Date of Patent: Dec. 30, 2014

(54) ELECTRIC VEHICLE MOBILE HOST SYSTEM—LOAD, LOCKDOWN AND CHARGING

(71) Applicant: GM Global Technology Operations LLC, Detroit, MI (US)

(72) Inventors: Wade W. Bryant, Grosse Pointe Farms, MI (US); Gael Buzyn, Pacific Palisades, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/746,177

(22) Filed: Jan. 21, 2013

(65) Prior Publication Data

US 2014/0205401 A1    Jul. 24, 2014

(51) Int. Cl.
*B60P 7/08*   (2006.01)
*B60P 3/06*   (2006.01)

(52) U.S. Cl.
CPC ....................................... *B60P 3/064* (2013.01)
USPC ............................................................ 410/4

(58) Field of Classification Search
USPC ........... 410/3, 4, 7; 104/88.02, 88.04, 130.01; 414/333, 373
See application file for complete search history.

(56) References Cited

U.S. PATENT DOCUMENTS

| | | | | |
|---|---|---|---|---|
| 3,788,238 A * | 1/1974 | Bennett | .............................. | 410/6 |
| 4,347,472 A * | 8/1982 | Lemelson | ..................... | 320/108 |
| 5,148,898 A * | 9/1992 | Musachio | .......................... | 191/6 |
| 5,730,578 A * | 3/1998 | Smidler | ......................... | 414/495 |
| 5,775,227 A * | 7/1998 | Mullen | ....................... | 104/88.04 |
| 5,782,187 A * | 7/1998 | Black et al. | ....................... | 105/3 |
| 6,435,100 B1 * | 8/2002 | Henderson | .................... | 104/242 |
| 6,564,721 B2 * | 5/2003 | Stiles | ....................... | 104/130.07 |

* cited by examiner

*Primary Examiner* — Glenn Dayoan
*Assistant Examiner* — Sunsurraye Westbrook
(74) *Attorney, Agent, or Firm* — BrooksGroup (57) ABSTRACT

One variation may include a system including a mobile host having a vehicle compartment defined therein and a receiving platform in the vehicle compartment having a plurality of guide features for guiding vehicles into the vehicle compartment of the mobile host, and a loading station including a loading platform having a plurality of vehicle guide features for guiding vehicles over the loading platform and onto the receiving platform. One variation may include a method comprising loading a vehicle into a mobile host having a vehicle compartment defined therein, wherein the mobile host includes a receiving platform having a plurality of raised guide features, and wherein the loading comprises guiding the vehicle onto the receiving platform using the plurality of raised guide features.

20 Claims, 8 Drawing Sheets

ELECTRIC VEHICLE MOBILE HOST SYSTEM—LOAD, LOCKDOWN AND CHARGING

TECHNICAL FIELD

The field to which the disclosure generally relates to includes electric vehicles, systems and methods of loading, locking and changing electric vehicle in a mobile host transporter.

BACKGROUND

Heretofore for electric vehicles have been utilized in a relatively limited travel range.

SUMMARY OF ILLUSTRATIVE VARIATIONS OF THE INVENTION

One variation may include a system including a mobile host having a vehicle compartment defined therein and a receiving platform in the vehicle compartment having a plurality of guide features for guiding vehicles into the vehicle compartment of the mobile host, and a loading station including a loading platform having a plurality of vehicle guide features for guiding vehicles over the loading platform and onto the receiving platform.

One variation may include a method comprising loading a vehicle into a mobile host having a vehicle compartment defined therein, wherein the mobile host includes a receiving platform having a plurality of raised guide features, and wherein the loading comprises guiding the vehicle onto the receiving platform using the plurality of raised guide features.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figures 1A, 1B:
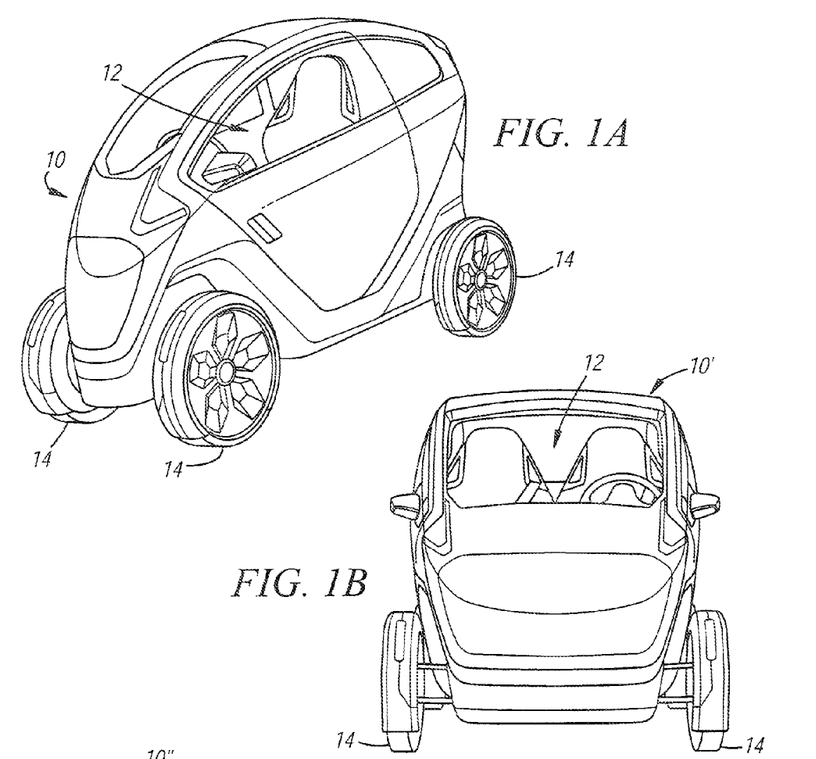
FIG. 1A illustrates a vehicle useful in a number of variations of the invention.
FIG. 1B illustrates a vehicle useful in a number of variations of the invention.
Figure 1C:
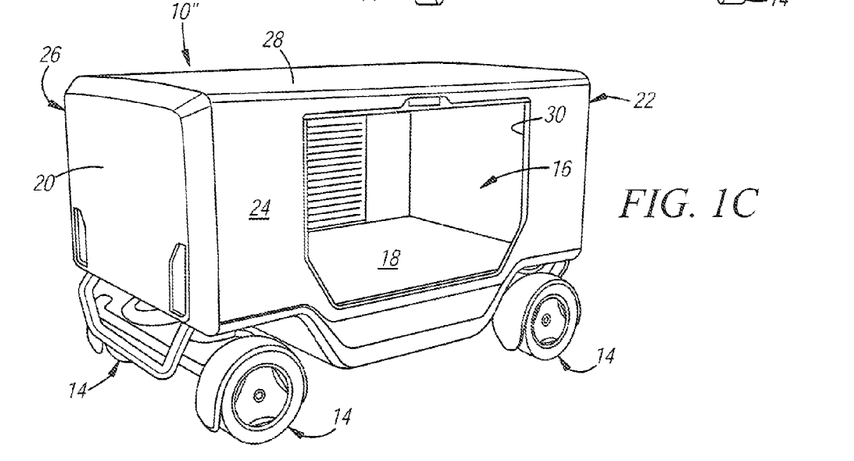
FIG. 1C illustrates a vehicle useful in a number of variations of the invention.

FIGS. 1A-1C illustrates that a number of different types of vehicles 10, 10', 10" may be utilized in a number of variations of the invention. The vehicles may include, but are not limited to, a relatively small electric vehicle 10 having a passenger compartment 12 for a single passenger as illustrated in FIG. 1A, a somewhat larger electric vehicle 10' which may have a compartment 12 for 2-4 passengers illustrated in FIG. 1B, or a cargo pod 10" as illustrated in FIG. 1C. The vehicles 10, 10', 10" illustrated in FIGS. 1A, 1B, and 1C may have wheels 14 on opposite sides of the vehicle which very in the distance there between. That is, the vehicles 10, 10', 10" in FIGS. 1A, 1B, and 1C have wheels with different wheel bases. The cargo pod 10" illustrated in FIG. 1C may include a cargo floor 18, a rear wall 20, opposite front wall 22, first side wall 24 and opposite sidewalk 26, and a roof 28 connected together to define a cargo compartment 16. A doorframe 30 may be provided in one of the walls to define a doorway communicating with the cargo compartment 16 through which cargo may be loaded.

Figure 2:
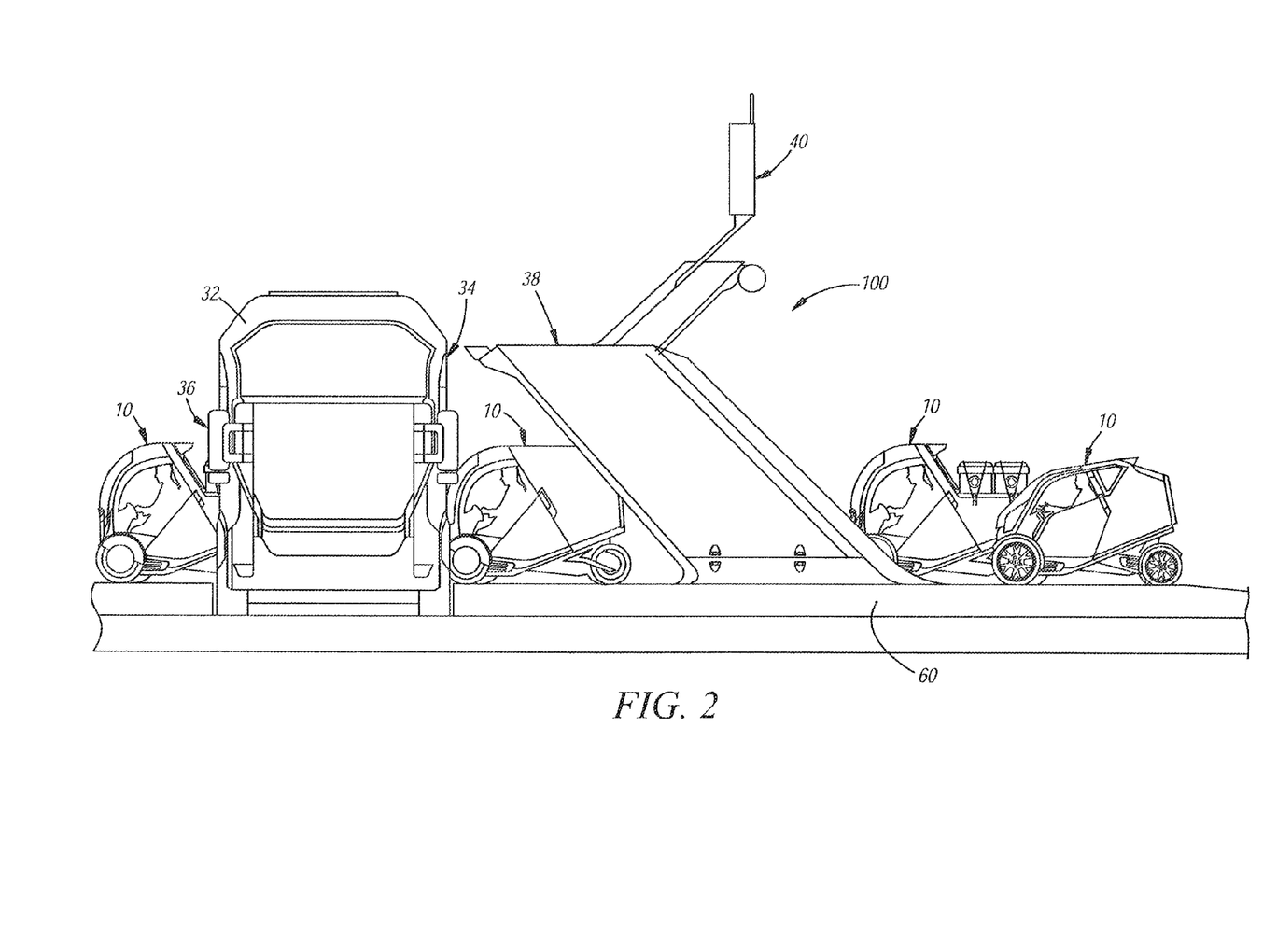
FIG. 2 is a schematic illustration of a method and a system including a mobile host for transporting and charging electric vehicles, and a loading station according to a number of variations of the invention.

FIG. 2 illustrates a system 100 including a mobile host transporter 32 such as a bus, truck, train, or marine transport vehicle which may include a vehicle compartment for receiving electric vehicles and transporting, and charging the electric vehicles. The system 100 may include a loading station 38 having a loading platform 60. In a number of variations operators of the vehicle may drive the vehicles over the loading platform 60 which may have guiding features (a number of variations of which are described hereafter). In a number of other variations the loading station 38 may include an electronic communicator 40 for sending guidance signals to guiding systems in each of the electronic vehicles 10 for autonomously moving the vehicles 10 along the loading platform 60, through the loading station 38 and through a first side 34 opening into the mobile host 32 and into the vehicle compartment. The vehicles 10 may exit a second opening in a second side 36 of the mobile host 32.

Figure 3:
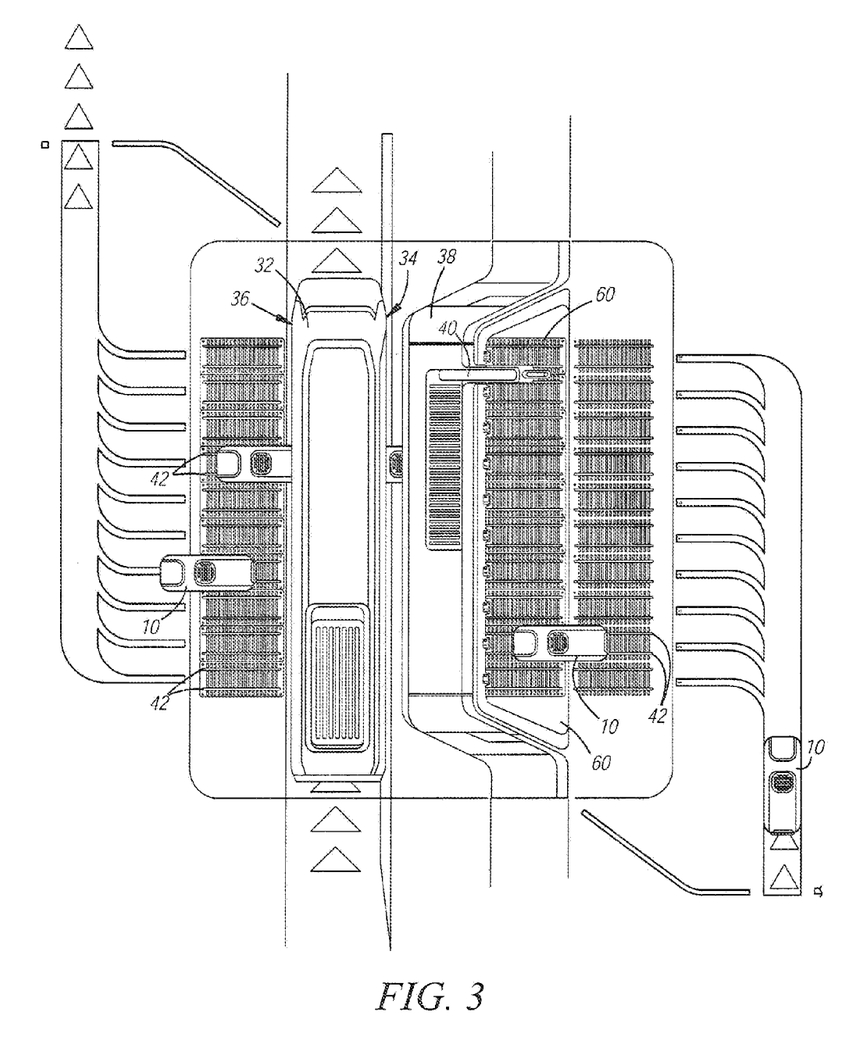
FIG. 3 is a schematic illustration, in a plan view, of a method and a system including a mobile host for transporting and charging electric vehicles, a loading station including a loading guide platform according to a number of variations of the invention.

FIG. 3 is a schematic illustration, in a plan view, showing a system 100 including a mobile host 32 and a loading station 38. The loading station 38 may include a loading platform 60 having a plurality of guiding tiles 42 for guiding the vehicle 10 along the loading platform 60 at a location in which the vehicle may enter the mobile host 32. The mobile host 32 may communicate with the loading station 38 in any of a variety of means including radio transmissions, satellite transmissions, Internet transmissions or other telematics means to convey information including which vehicle station(s) or area(s) in the vehicle compartment of the mobile host 32 do not include a vehicle therein and which are open to receive a vehicle ready to be loaded in the mobile host 32 from the loading station 38. Furthermore, the mobile host 32 and the loading station 38 may communicate with each other to convey additional information such as which vehicles on the mobile host 32 that will be arriving at the loading station 38 will be exiting the mobile host 32 at the loading station 38 to free up a vehicle station or area in the vehicle compartment of the mobile host 32 into which thereafter a vehicle at the loading station 32 may be loaded therein.

Figure 4A:
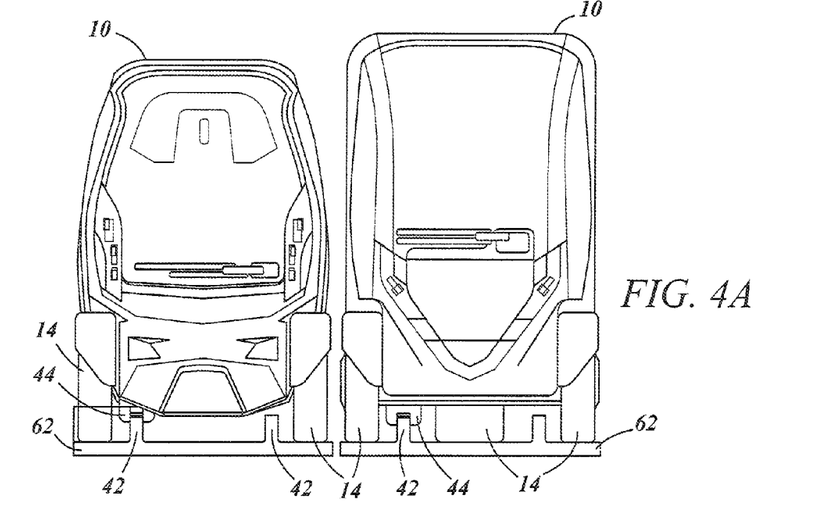
FIG. 4A is a schematic illustration of two vehicles positioned on two sections of a receiving platform of the mobile host wherein one of the vehicles has three wheels according to a number of variations of the invention.

FIG. 4A illustrates to vehicles 10 on respective sections of a receiving platform 62 in the mobile host 32. The receiving platform 62 may have a plurality of guide tiles 42 raised up from a surface of the receiving platform 62 on which the vehicle tires ride or rest. In a number of variations, the vehicles 10 may include a guide tile receptor 44 having a slot formed therein for receiving a guide the 42. The receiving platform 62 may have guide tiles 42 spaced apart to accommodate a number of different vehicles including vehicles having three wheels as illustrated by one of the vehicles in FIG. 4A.

Figure 4B:
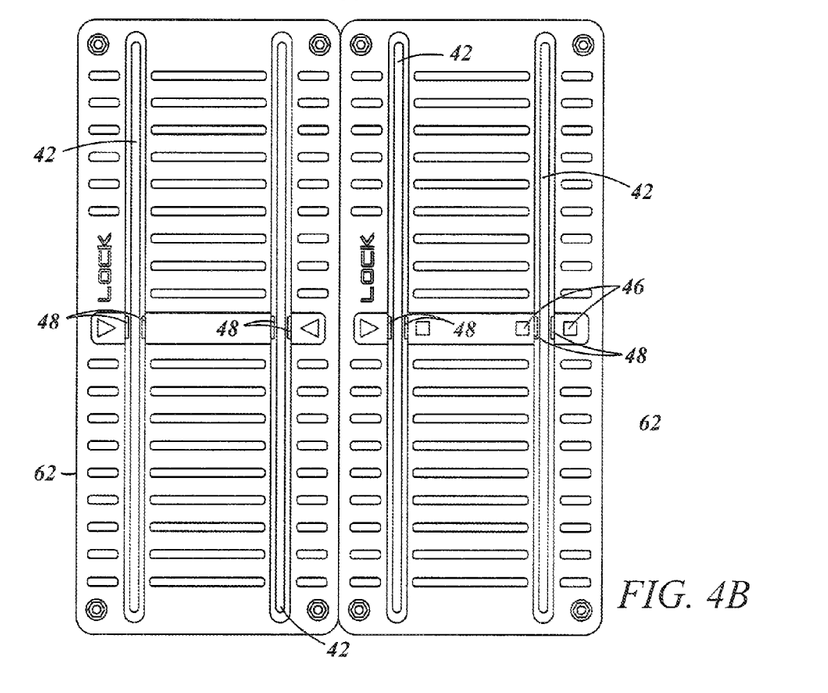
FIG. 4B is a plan view of two sections of a receiving platform of the mobile host including a plurality of guiding tiles according to a number of variations of the invention.

FIG. 4B is a plan view of sections of the receiving platform 62 in the mobile host 32. In a number of variations, a section of the receiving platform 62 may have a pair of spaced apart guide tiles 42. In a number of variations, the guide tiles 42 may include charging connectors 48 on opposite sides of the guide tile 42 for contact with respective electrical connectors in the guide tile receptor 44 on the vehicle 10. In a number of variations, the receiving platform section 62 may include one or more locking mechanisms 46 to lock the vehicle 10 on the receiving platform 62. The locking mechanisms may be retractable structures which engage mating structures on the vehicle chassis or on the guide tile receptor 44.

Figure 5:
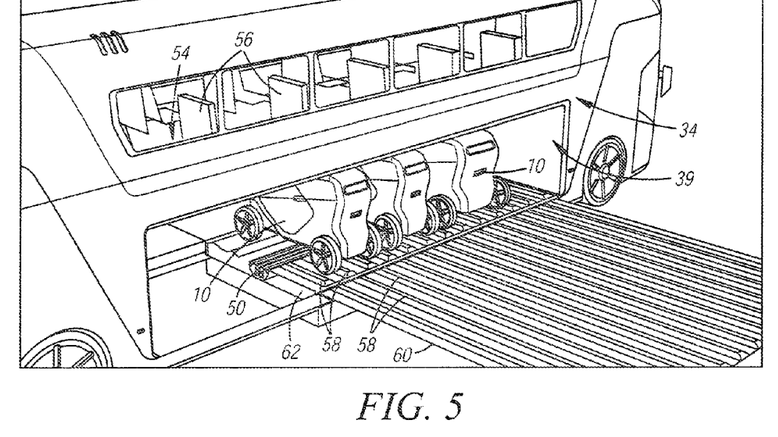
FIG. 5 is a perspective view with portions broken away of a mobile host having a plurality of vehicles received in a vehicle compartment wherein the mobile host is positioned next to a loading platform according to a number of variations of the invention.

A number of variations of the invention are illustrated by FIG. 5 and may include a mobile host 32 having a vehicle compartment 39 and a plurality of vehicles 10 received therein on a receiving platform 62. The mobile host 32 may also include a passenger compartment 54 including a plurality of passenger seats 56 for transporting vehicle operators along with the vehicles 10. A loading guide platform 60 having a plurality of raised lands 58 which may be used to guide the wheels of the vehicles 10. Adjacent raised features 58 may define a channel for receiving a wheel 14 of the vehicle. The receiving platform 62 may have a plurality of raised lands 58 aligned with the raised lands 58 of the loading platform 60. An alternative locking mechanism 50 (a number of variations of which will be described hereafter) may be provided in the receiving platform 62.

Figure 6:
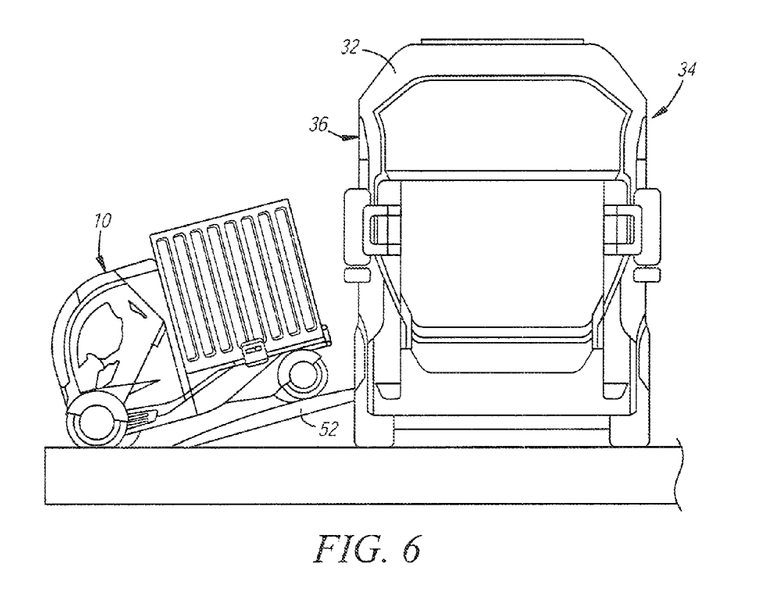
FIG. 6 is a schematic illustration of a vehicle being unloaded from a mobile host according to a number of variations of the invention.

FIG. 6 illustrates a mobile host 32 and a method of unloading vehicles from one side 36 of the mobile host 32 utilizing a ramp 52.

Figure 7:
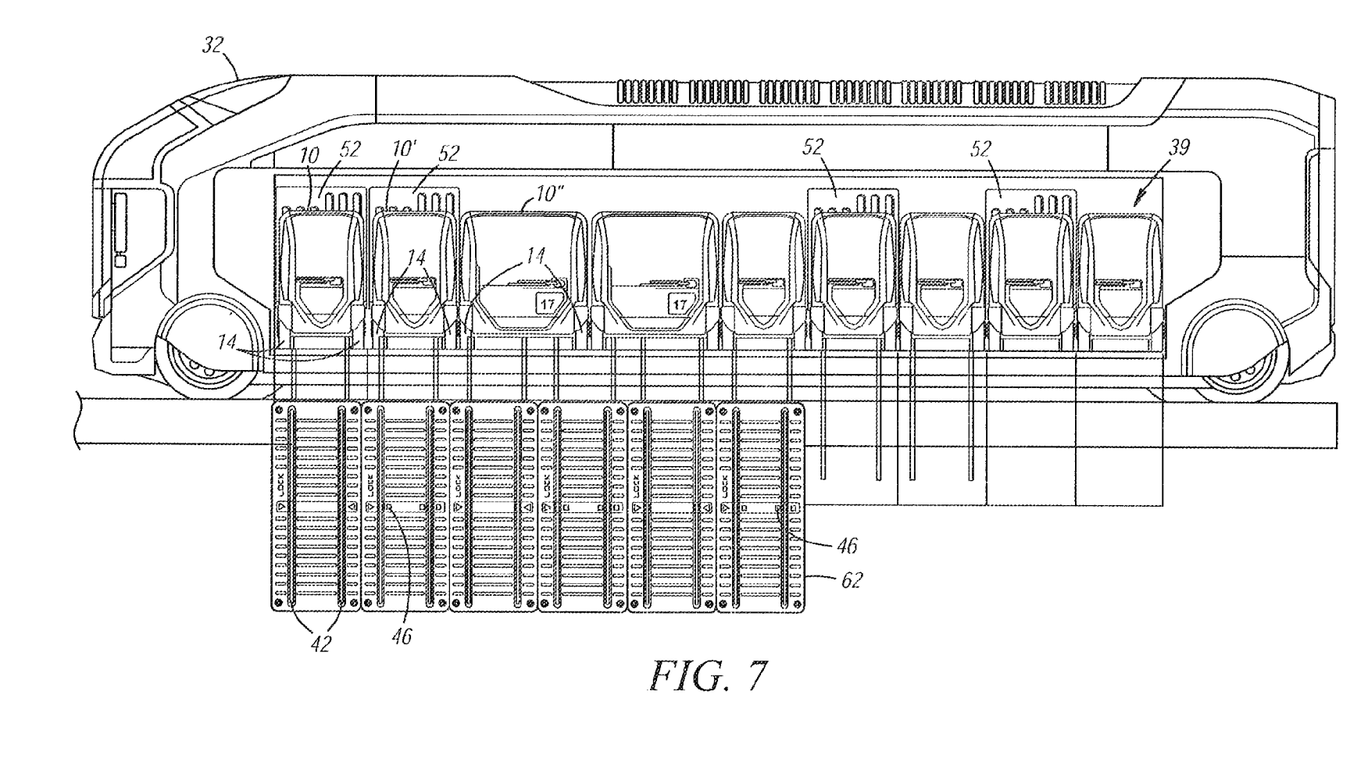
FIG. 7 is a schematic illustration of a host vehicle having a plurality of vehicles received in a vehicle compartment wherein the host vehicle includes a receiving platform arranged to accommodate a plurality of vehicles having different varying wheel bases, overall widths, track dimensions, or wheel positions according to a number of variations of the invention.

A number of variations are illustrated in FIG. 7 which may include a flip up ramp 52 connected to the receiving platform 62 of the mobile host 32. In FIG. 7 a number of sections of the receiving platform 62 are shown removed from the mobile host 32 to better illustrate the guiding tiles 42 and locking mechanism 46 thereof.

Figure 8:
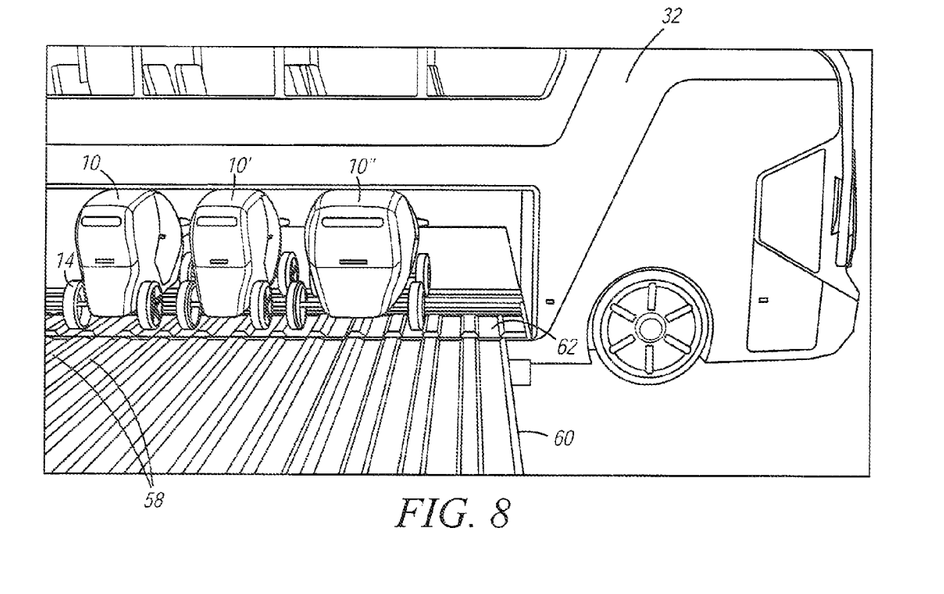
FIG. 8 is a partial view of a mobile host, a plurality of raised lands on the loading platform and the receiving platform of the vehicle and wherein the vehicles according to a number of variations of the invention.

FIG. 8 illustrates a number of variations of the invention including a loading platform 60 and a receiving platform 62 of the host vehicle 32 each having aligned raised lands 58. As shown in FIG. 8, a variety of vehicles 10, 10', 10" having different varying wheel bases, overall widths, track dimensions, or wheel positions may be guided over the loading platform 60 and onto the receiving platform 62 of the mobile host 32.

Figure 9:
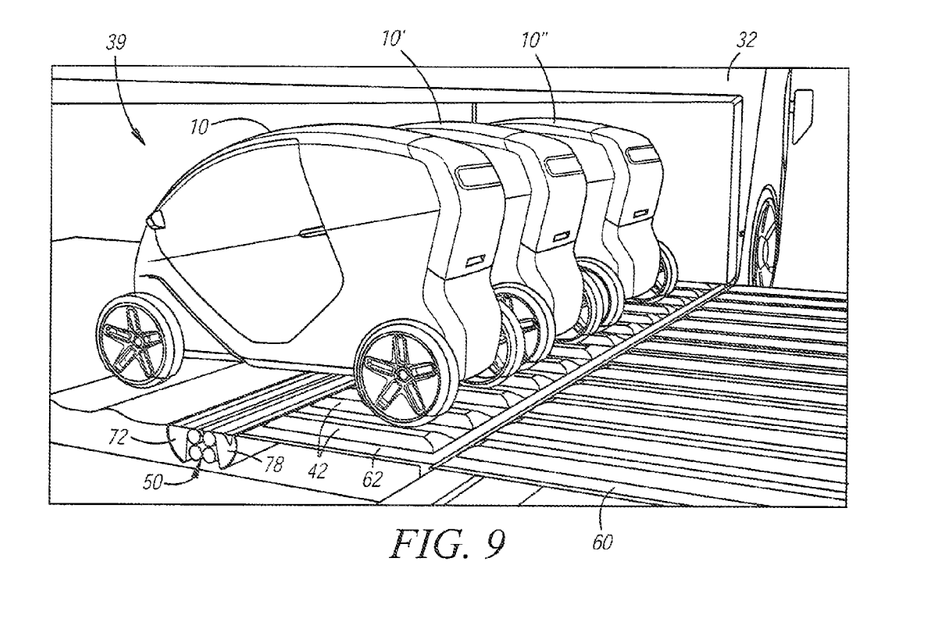
FIG. 9 is a partial perspective view showing a plurality of vehicles received in a vehicle compartment of a mobile host wherein the receiving platform of the mobile host has an alternative locking and/or charging mechanism according to a number of variations of the invention.

FIG. 9 illustrates an alternative locking mechanism 50 provided in the receiving platform 62 of the mobile host 32. The locking mechanism 50 may include a first rotatable cam 72 and a second rotatable cam 78.

Figure 10:
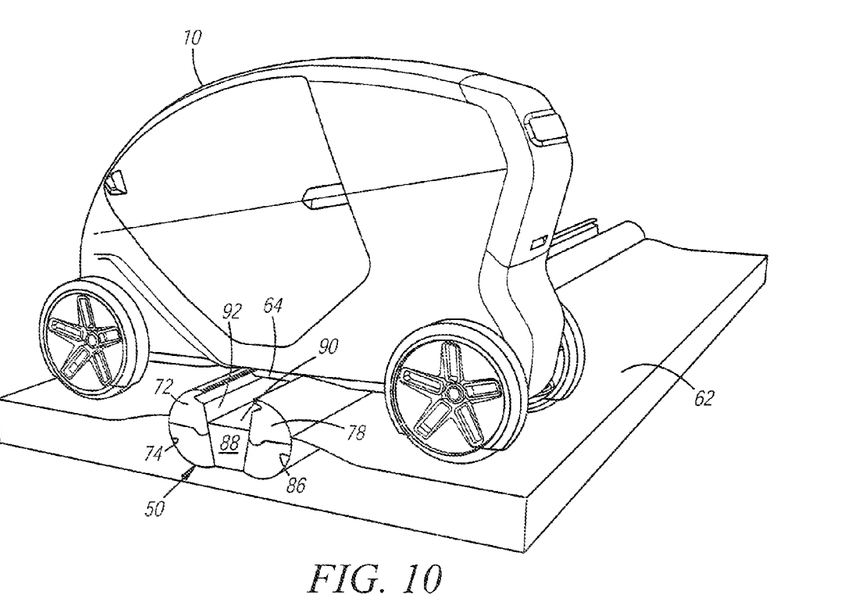
FIG. 10 is a perspective view of a vehicle locked to a receiving platform of a mobile host using a rotatable locking cam mechanism according to a number of variations of the invention.
Figure 11:
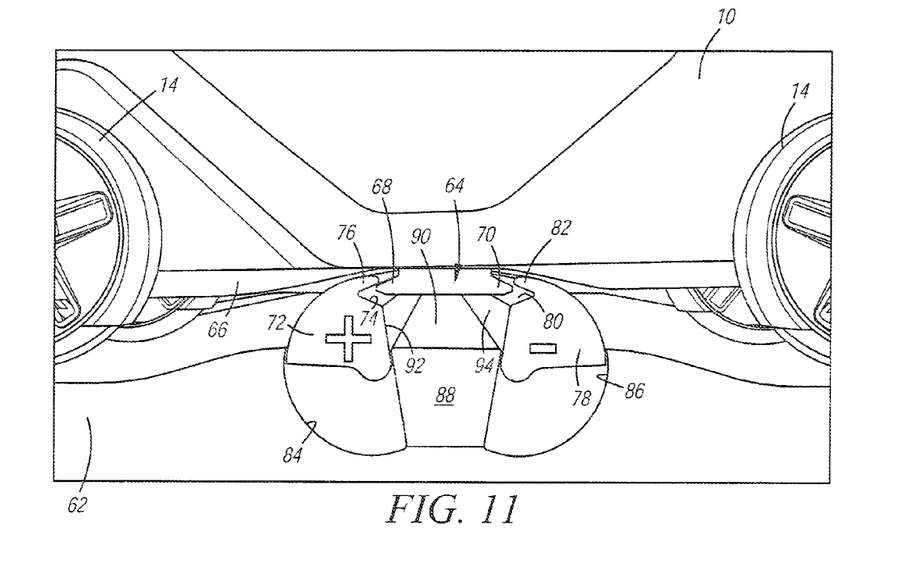
FIG. 11 is a partial view of a vehicle being lack to an charged by a rotatable locking cam mechanism having opposite charging contacts on opposed cams according to a number of variations of the invention.

FIGS. 10-11 illustrates a number of other variations of the invention including a lock beam 64 provided on the chassis 66 of the vehicle. In a number of variations the lock beam 64 may include a first outwardly extending flange or finger 68 and an opposite outwardly flange or finger 70. The first rotatable cam 72 and second rotatable cam 78 may be positioned on opposite sides of a beam like structure 88 provided in or as a part of the receiving platform 62 of the host vehicle 32. The first rotatable cam 72 may have a first pawl 78 and a first recess 74 formed in the cam 72 constructed and arranged to receive the first finger 68 of the lock beam 64 attached to the vehicle 10. The second cam 78 may include a second pawl 82 and may have a second recess 80 formed in the cam 78 constructed and arranged to receive the second finger 70 of the lock beam 64 attached to the vehicle 10. The first cam 62 may be rotated to a first position in which the first pawl 76 is positioned over the first finger 68 of the lock beam 64 and so that the first finger 68 is received in the first recess 74 of the first cam 72. Similarly, the second cam 78 may be rotated to a first position in which the second pawl 82 may be received over the second finger 70 of the lock beam 64 attached to the vehicle 10 and so that the second finger 70 may be received in the second recess 80 of the second cam 78. The first cam 72 may have a relatively flat surface 92 adjacent the first recess 74. Similarly, the second cam 78 may have a flat surface 94 adjacent the second recess 80. The first cam 72 and second cam 78 may be rotated to a second position so that a portion of each cam including the respective pawls 76, 82 are received in the first cam receiving recess 84 and the second cam receiving recess 86 respectively. When the first cam 72 and the second cam 78 are rotated to the second positions, the first surface 92 of the first cam 72 and the second surface 94 of the second cam may be aligned with the top surface 90 of the beam like structure 88 provided in or on the receiving platform 72. The aligned surfaces 92, 90, and 94 may be constructed and allowed arranged so that the vehicle 10 may drive relatively smoothly over the lock mechanism 50 when the cams 72 and 78 are in the retracted second positions. The first cam 72 and second cam 78 may have opposite charged contacts for contacting respective contacts on the lock beam 64 and charging a battery in the vehicle 10.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a system comprising: a mobile host having a vehicle compartment defined therein and a receiving platform in the vehicle compartment having a plurality of guide features for guiding vehicles into the vehicle compartment of the mobile host, and a loading station including a loading platform having a plurality of vehicle guide features for guiding vehicles over the loading platform and onto the receiving platform.

Variation 2 may include a system as set forth in Variation 1 wherein the plurality of guide features of the receiving platform and the plurality of guide features of the loading platform each comprise guiding tiles.

Variation 3 may include a system as set forth in any of Variations 1-2 further comprising a plurality of vehicles each including a guide tile receptor constructed and arranged to receive the guide tiles.

Variation 4 may include a system as set forth in any of Variations 1-3 further comprising a plurality of vehicles each having electronic communication device, and further comprising a first electronic communication system constructed and arranged to send guiding signals to the vehicles to autonomously guide the vehicles over the loading platform and into the mobile host.

Variation 5 may include a system as set forth in any of Variations 1-4 wherein the mobile host includes a second electronic communication system for communicating with the first electronic communication system and sending information regarding which areas of the vehicle compartment of the mobile host do not have a vehicle therein.

Variation 6 may include a system as set forth in any of Variations 1-5 wherein the plurality of guide tiles are spaced apart to accommodate vehicles having varying wheel bases, overall widths, track dimensions, or wheel positions.

Variation 7 may include a system as set forth in any of Variations 1-6 wherein the receiving platform includes a locking feature for locking a vehicle to the receiving platform.

Variation 8 may include a system as set forth in any of Variations 1-7 wherein the receiving platform includes a mechanism for locking a vehicle to the receiving platform and for charging the vehicle.

Variation 9 may include a system as set forth in any of Variations 1-8 wherein the receiving platform includes a plurality of guide tiles and wherein the mechanism for locking includes electrical contacts on the guide tiles.

Variation 10 may include a system as set forth in any of Variations 1-9 wherein the receiving platform includes a pair of rotatable cams having features for locking to the vehicle and wherein the pair of rotatable cams have opposite charged electrical contacts.

Variation 11 may include a system as set forth in any of Variations 1-10 further comprising a vehicle having a lock beam attached to a chassis of the vehicle, the lock beam having a first outwardly extending finger and having an opposite second outwardly extending finger, and wherein the rotatable cams comprises a first cam having a first pawl and a first recess constructed and arranged so that when the first cam is in a first position the first pawl is positioned over the first finger and so that the first finger is received in the first recess, and wherein the rotatable cams comprises a second cam having a second pawl and a second recess constructed and arranged so that when the second cam is in a first position the second pawl is positioned over the second finger and so that the second finger is received in the second recess.

Variation 12 may include a system as set forth in any of Variations 1-11 wherein the receiving platform includes a first cam recess and a second cam recess and wherein the first cam and the second cam are constructed and arranged to rotate from the first position to a second position wherein the first pawl and the second pawl are received in the first cam recess and the second cam recess respectively.

Variation 13 may include a system as set forth in any of Variations 1-12 wherein the receiving platform further includes a locking feature constructed and arranged to engage a mating locking feature on the vehicle.

Variation 14 may include a system as set forth in any of Variations 1-13 wherein the mating locking feature on the vehicle comprises a locking feature on one of a chassis or the guide tile receptor.

Variation 15 may include a system as set forth in any of Variations 1-14 further comprising a ramp pivotally connected to the mobile host to facilitate loading or unloading vehicles from mobile host.

Variation 16 may include a method comprising loading a vehicle into a mobile host having a vehicle compartment defined therein, wherein the mobile host includes a receiving platform having a plurality of raised guide features, and wherein the loading comprises guiding a vehicle onto the receiving platform using the plurality of raised guide features.

Variation 17 may include a system as set forth in Variation 16 wherein the receiving platform includes a first locking mechanism and wherein the vehicle includes a mating second locking mechanism, and locking the vehicle to the receiving platform using the first locking mechanism and the second locking mechanism.

Variation 18 may include a system as set forth in any of Variations 16-17 wherein the vehicle includes a battery, and wherein the receiving platform includes a first locking and charging mechanism and wherein the vehicle includes a mating second locking and charging mechanism, and locking the vehicle to the receiving platform and charging the battery of the vehicle comprising moving the first locking and charging mechanism into engagement with the mating second locking and charging mechanism.

Variation 19 may include a system as set forth in any of Variations 16-18 wherein the receiving platform includes at least one rotatable cam, the rotatable cam including at least one pawl, and wherein the vehicle includes pawl engagement feature, and rotating the at least one rotatable cam so that the at least one pawl engages the pawl engagement feature and so that the vehicle is locked to the receiving platform.

Variation 20 may include a system as set forth in any of Variations 16-19 wherein the pawl engagement feature comprises an outwardly extending finger of a lock beam connected to the vehicle.

Variation 21 may include a method of moving a vehicle into a mobile host using a system as set forth in any of Variations 1-15.

The above description of select examples of the invention is merely exemplary in nature and, thus, variations or variants thereof are not to be regarded as a departure from the spirit and scope of the invention.

What is claimed is:
1. A system comprising:
a mobile host having a vehicle compartment defined therein and a receiving platform in the vehicle compartment having a plurality of guide features for guiding vehicles into the vehicle compartment of the mobile host, and a loading station including a loading platform having a plurality of vehicle guide features for guiding vehicles over the loading platform and onto the receiv- ing platform wherein the receiving platform includes at least one rotatable cam having features for locking to the vehicle.

2. A system as set forth in claim 1 wherein the plurality of guide features of the receiving platform and the plurality of guide features of the loading platform each comprise guiding tiles.

3. A system as set forth in claim 2 further comprising a plurality of vehicles each including a guide tile receptor constructed and arranged to receive the guide tiles.

4. A system as set forth in claim 1 further comprising a plurality of vehicles each having electronic communication device, and further comprising a first electronic communication system constructed and arranged to send guiding signals to the vehicles to autonomously guide the vehicles over the loading platform and into the mobile host.

5. A system as set forth in claim 4 wherein the mobile host includes second electronic communication system for communicating with the first electronic communication system and sending information regarding which areas of the vehicle compartment of the mobile host do not have a vehicle therein.

6. A system as set forth in claim 2 wherein the plurality of guide tiles are spaced apart to accommodate vehicles having varying wheel bases, overall widths, track dimensions, or wheel positions.

7. A system as set forth in claim 1 wherein the receiving platform includes a locking feature for locking a vehicle to the receiving platform.

8. The system is set forth in claim 1 wherein the receiving platform includes a mechanism for locking a vehicle to the receiving platform and for charging the vehicle.

9. A system as set forth in claim 8 wherein the receiving platform includes a plurality of guide tiles and wherein the mechanism for locking includes electrical contacts on the guide tiles.

10. A system as set forth in claim 8 wherein the receiving platform includes a pair of rotatable cams having features for locking to the vehicle and wherein the pair of rotatable cams have opposite charged electrical contacts.

11. A system as set forth in claim 10 further comprising a vehicle having a lock beam attached to a chassis of the vehicle, the lock beam having a first outwardly extending finger and having an opposite second outwardly extending finger, and wherein the rotatable cams comprises a first cam having a first pawl and a first recess constructed and arranged so that when the first cam is in a first position the first pawl is positioned over the first finger and so that the first finger is received in the first recess, and wherein the rotatable cams comprises a second cam having a second pawl and a second recess constructed and arranged so that when the second cam is in a first position the second pawl is positioned over the second finger and so that the second finger is received in the second recess.

12. A system as set forth in claim 11 wherein the receiving platform includes a first earn recess and a second cam recess and wherein the first cam and the second cam are constructed and arranged to rotate from the first position to a second position wherein the first pawl and the second pawl are received in the first cam recess and the second cam recess respectively.

13. A system the set forth in claim 3 wherein the receiving platform further includes a locking feature constructed and arranged to engage a mating locking feature on the vehicle.

14. A system as set forth in claim 13 wherein the mating locking feature on the vehicle comprises a locking feature on one of a chassis or the guide tile receptor.

15. A system as set forth in claim 1 further comprising a ramp pivotally connected to the mobile host to facilitate loading or unloading vehicles from mobile host.

16. A method comprising loading a vehicle into a mobile host having a vehicle compartment defined therein, wherein the mobile host includes a receiving platform having a plurality of raised guide features, and wherein the loading comprises guiding a vehicle onto the receiving platform using the plurality of raised guide features wherein the receiving platform includes at least one rotatable cam having features for locking to the vehicle.

17. A method as set forth in claim 16 wherein the receiving platform includes a first locking mechanism and wherein the vehicle includes a mating second locking mechanism, and locking the vehicle to the receiving platform using the first locking mechanism and the second locking mechanism.

18. A method as set forth in claim 16 wherein the vehicle includes a battery, and wherein the receiving platform includes a first locking and charging mechanism and wherein the vehicle includes a mating second locking and charging mechanism, and locking the vehicle to the receiving platform and charging the battery of the vehicle comprising moving the first locking and charging mechanism into engagement with the mating second locking and charging mechanism.

19. A method as set forth in claim 16 wherein the receiving platform includes at least one rotatable cam, the rotatable cam including at least one pawl, and wherein the vehicle includes pawl engagement feature, and rotating the at least one rotatable cam so that the at least one pawl engages the pawl engagement feature and so that the vehicle is locked to the receiving platform.

20. A method as set forth in claim 19 wherein the pawl engagement feature comprises an outwardly extending finger of a lock beam connected to the vehicle.

* * * * *